(No Model.)  
E. A. WILDER.  
FILTER.

No. 557,177.  
4 Sheets—Sheet 2.  
Patented Mar. 31, 1896.

WITNESSES:  
H. E. Spencer  
Milton M. Goldsmith

INVENTOR  
Edgar A. Wilder  
BY  
H. A. West  
ATTORNEY (No Model.) 4 Sheets—Sheet 3.

E. A. WILDER.
FILTER.

No. 557,177. Patented Mar. 31, 1896.

WITNESSES:
H. E. Spencer
Milton M. Goldsmith

INVENTOR
Edgar A. Wilder,
BY H. A. West,
ATTORNEY (No Model.) 4 Sheets—Sheet 4.
E. A. WILDER.
FILTER.
No. 557,177. Patented Mar. 31, 1896.
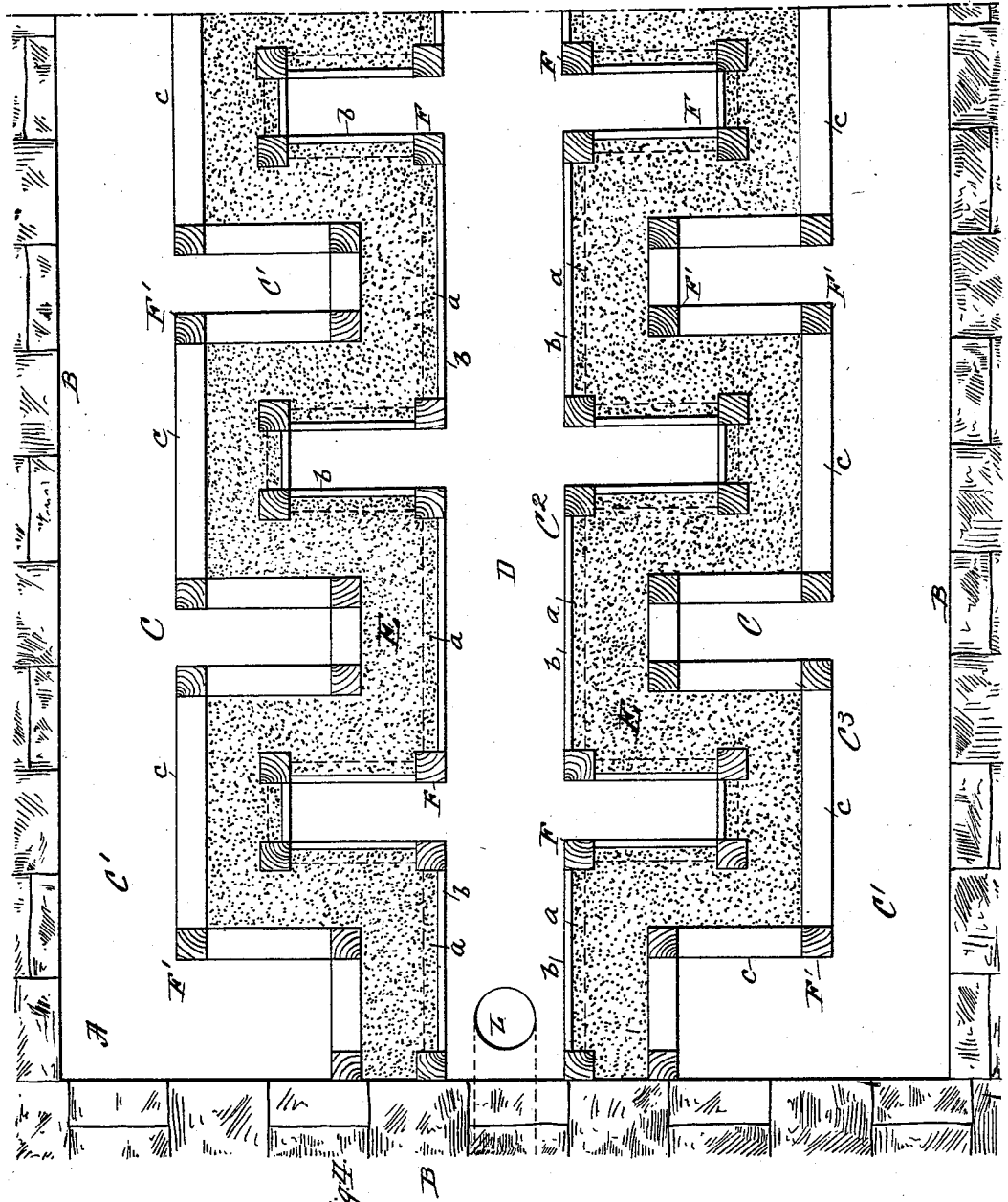
WITNESSES:
H. E. Spencer
Milton M. Goldsmith
INVENTOR
Edgar A. Wilder
BY H. A. West
ATTORNEY

UNITED STATES PATENT OFFICE.

EDGAR A. WILDER, OF FREDONIA, NEW YORK.

FILTER.

SPECIFICATION forming part of Letters Patent No. 557,177, dated March 31, 1896.

Application filed May 16, 1895. Serial No. 549,528. (No model.)

*To all whom it may concern:*

Be it known that I, EDGAR A. WILDER, a citizen of the United States, and a resident of Fredonia, in the county of Chautauqua and State of New York, have invented certain new and useful Improvements in Filters, of which the following is a specification.

My invention relates to a filter designed mainly for use in storage reservoirs, settling-tanks, intake-wells, cisterns, &c., for purifying water before or during its delivery for use or consumption.

My invention consists principally in such construction of a filter that the filtering material, preferably sand or fine gravel, either loose or more or less compact, will be held to form a wall or partition dividing the receiving or storage reservoir into galleries for unfiltered and filtered water, so that inclined or sloping surfaces of the filtering material will be presented to receive the deposit of salt and other impurities from the unfiltered water.

I construct my new filter so as to form one or more comparatively high and narrow chambers or galleries for unfiltered and filtered water, respectively, the filtering material being a body of sand placed between open walls, which, together with the body of filtering material, form said chambers or galleries for the unfiltered and the filtered water, one or both of said open walls being formed of spaced slats or bars, between which the main body of sand or other filtering material can be held in practically a vertical position, while the portion thereof between the slats or bars will at the same time present an outer filtering-surface greater than the area of a section of the body of filtering material in a plane with the outer surface of the filter. This result I prefer to attain by a series of small natural slopes of the sand or filtering material which finds its way out from the main body thereof and rests upon and between the said spaced slats or bars. Slopes of steeper pitch, however, may be obtained by prepared filtering material, as by loosely mixing the sand or fine gravel with hydraulic cement or by placing inclined perforated or other retaining-strips in the spaces between the said slats or bars.

Figure 1:
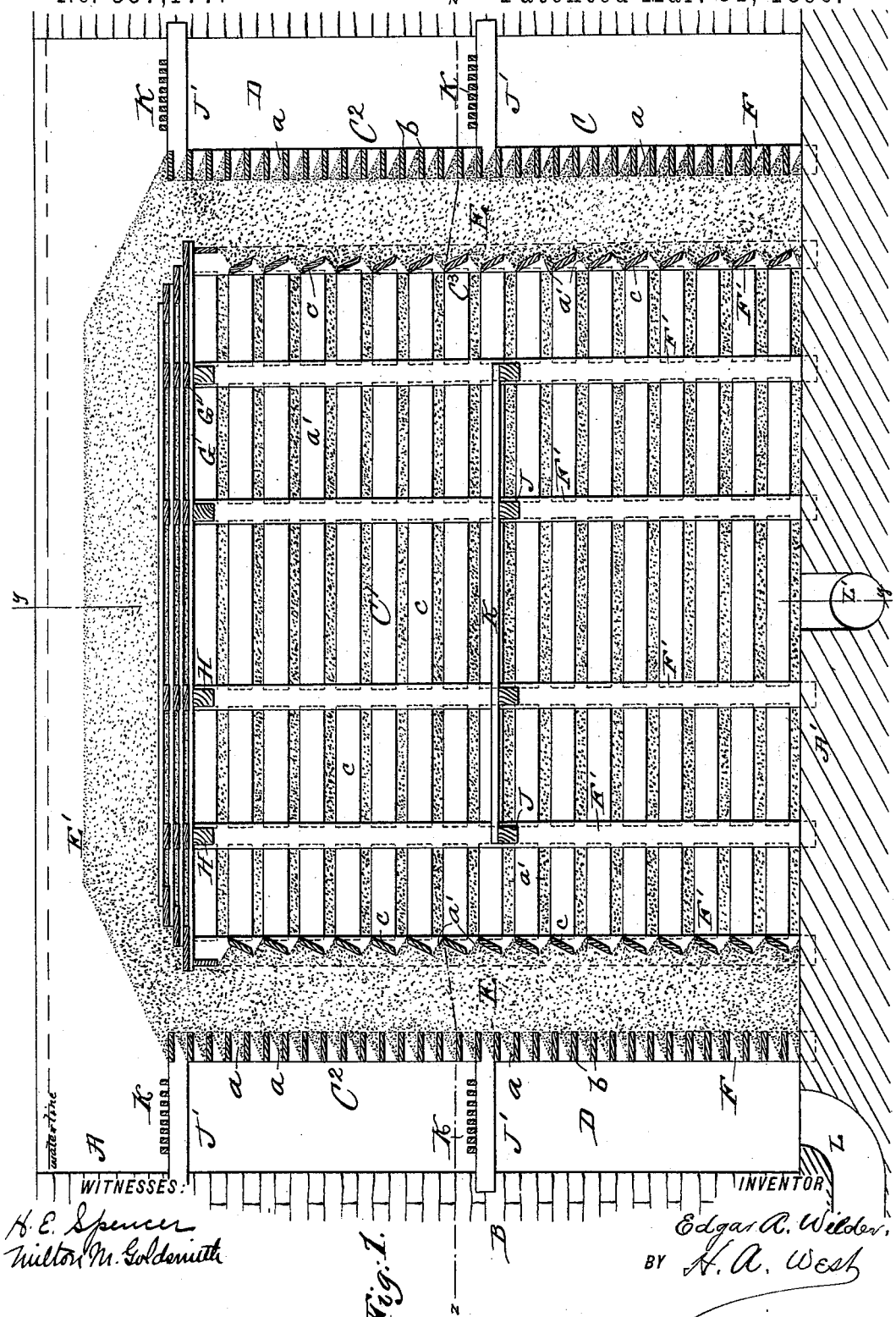
Figure 2:
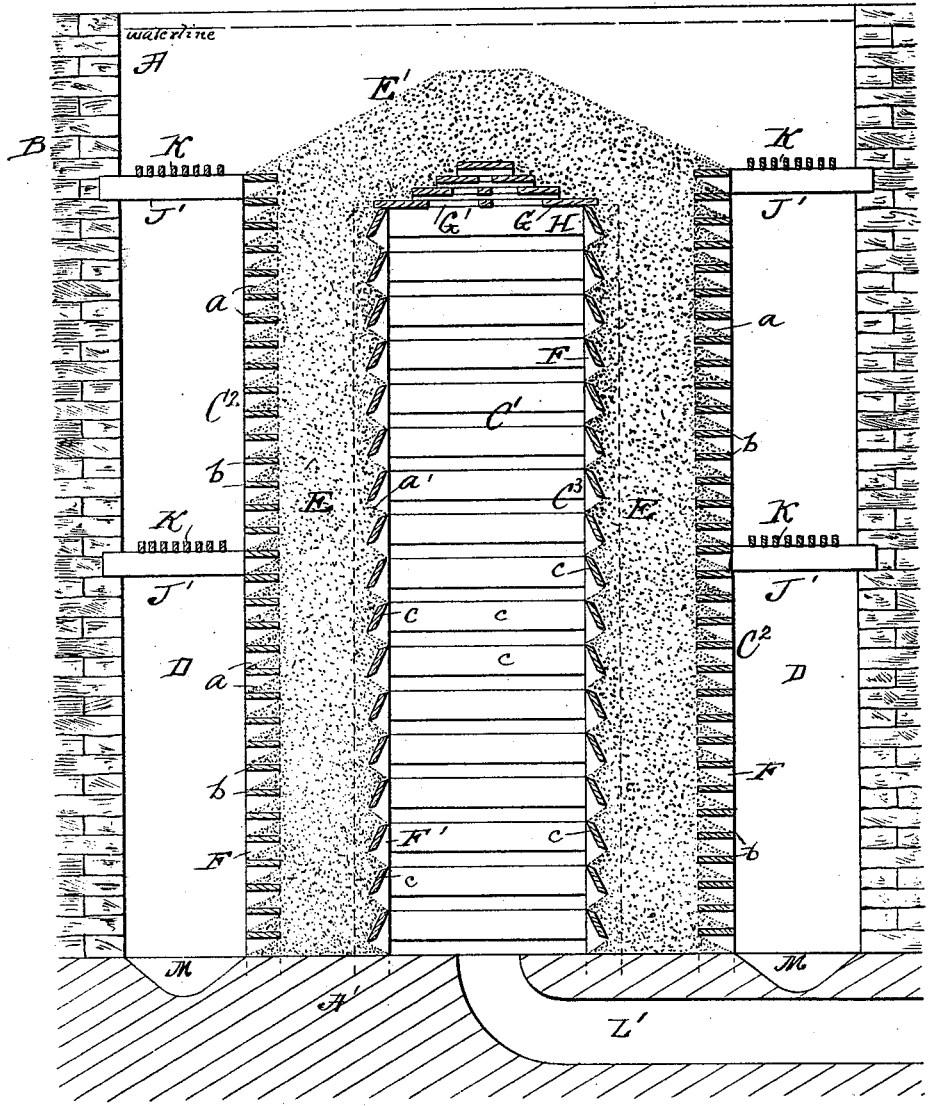
Figure 3:
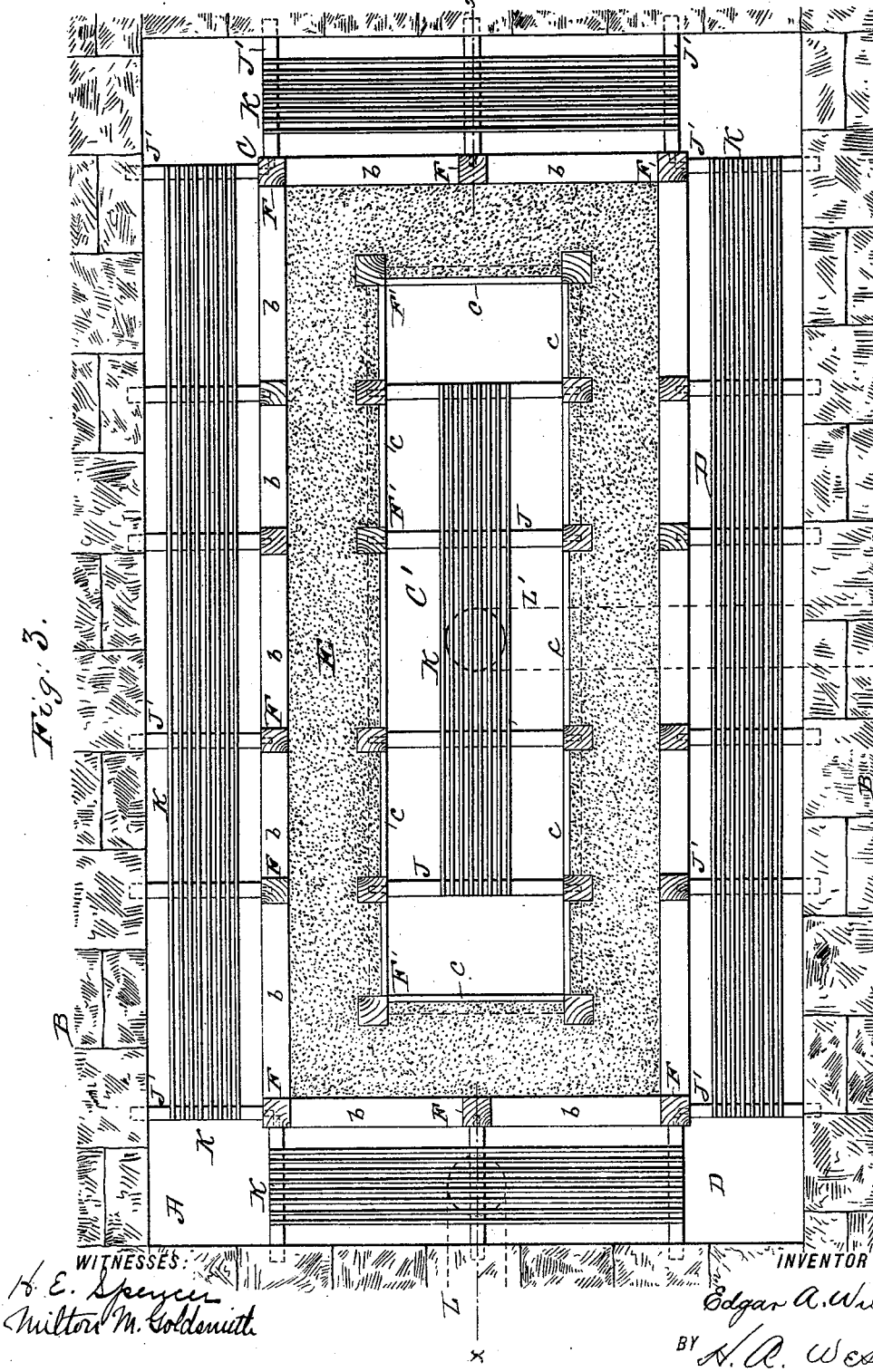

In the accompanying drawings, to which reference is made, Figure 1 is a longitudinal sectional elevation of a filter made in accordance with the principles of my invention, the section being taken on line $x\, x$ of Fig. 3. Fig. 2 is a transverse sectional elevation of the same, taken on line $y\, y$ of Fig. 1. Fig. 3 is a sectional plan view taken on line $z\, z$ of Fig. 1, and Fig. 4 is a sectional plan showing a modified construction of the filtering-walls and of the chambers or galleries for unfiltered and filtered water.

A represents a tank, cistern, or reservoir, here shown as formed of masonry B. In said reservoir, upon the bottom A' thereof, is placed or built the filter C, which is so constructed as to form a chamber or gallery C' for filtered water. The space D between the outer walls $C^2$ of the filter and the walls of the reservoir constitutes a receiving chamber or gallery for unfiltered water.

The filter is constructed of double walls—that is, of the said outer wall $C^2$ and the inner parallel wall $C^3$—and the body E of filtering material, preferably fine gravel or sand, interposed between the said outer and inner walls. The outer wall of the filter is so constructed that the filtering material will form, or may be formed into, a succession of inclined or sloping steps $a\, a$, which augment the superficial filtering-surface. I prefer that the degree of obliquity or slant of these said sloping surfaces $a\, a$ of filtering material shall be the natural detour of the sand or gravel in finding lodgment upon a horizontal surface, as such a degree of slant is best calculated to effect a proper detention of the silt and other impurities, and at the same time cause any over-accumulation of silt to gradually dislodge itself or slide off from the oblique surfaces and settle down to the bottom of the reservoir or tank, thus effecting in a marked degree the self-cleaning of the filter. The said outer wall of the filter is built up of a series of bars or slats $b\, b$, which are by preference, and for reasons stated, horizontally held in suitable posts or uprights F F and spaced, with four inches or thereabout in the clear, so that when the filtering material is filled in between the two walls of the filter the sand will flow out between the slats or bars, and resting thereon form the inclined steps $a\, a$.

The inner walls of the filter may be formed of horizontally-placed slats, as just described;

but I prefer to form them of diagonally-placed slats or bars *c c*, held in uprights or posts F', which slats or bars are suitably spaced to form filtering room between them. As here shown they are so placed as to cause the filtering material to form sloping surfaces *a' a'*; but this is not regarded as essential to the proper action of the filter, since it is only necessary that free passage of water be permitted through the inner walls and that the filtering material be held in place. The slats or bars *b* of the outer walls may be held in more or less oblique position, as are the slats or bars *c*, if desired.

In all cases where there is likelihood of freezing or where the filter-frame is made of wood, I prefer to entirely submerge the filter and roof it over with filtering material E', as clearly shown in Figs. 1 and 2. This roof or top filtering material E' is supported upon spaced roof-boards G and interposed cross-pieces G', which are supported upon the joists H H, framed into or otherwise secured to the upper ends of opposite posts F', said joists serving also to brace and strengthen the structure.

J J represent joists or beams framed into opposite posts F' to still further interiorly strengthen the structure, and J' J' represent beams reaching from the walls of the reservoir or cistern to the posts F, to exteriorly brace the structure.

K K represent staying-boards placed on the series joists J and J' to facilitate the building of the filter and also the work of repairing and cleaning the filter and reservoir or cistern.

The supply of water is admitted to the reservoir or cistern, as here shown, through a pipe or main L, and filtered water is delivered from the chamber or gallery C' through pipe or main L', both at the bottom; but it is obvious that water may be admitted at the top of the reservoir and that filtered water may be pumped or otherwise drawn from the chamber or gallery C'.

Along the sides of the filter I prefer to form, in the bottom A' of the reservoir, a channel or gutter M, which receives the silt or sediment and permits the sediment in settling to descend to a point below the bottom of the filter, so that the pressure of water will not tend to force any of it through the filter. In other words, the base A', on which the filter rests, is elevated, so that a bottom space or trap is formed to receive and retain the sediment at a point below the bottom of the filtering material, which trap not only prevents the sediment from working its way into the filtering material, but greatly facilitates the cleaning of the filter. In case the reservoir and filter be built adjacent to a sewer or is supplied with water by a pump the trap M and the whole interior of the cistern or reservoir and the exterior of the filter may be flushed out into the sewer at any point along the trap M.

In Fig. 4 the filter, instead of being built to form an inclosed gallery for filtered water, its walls are built across the cistern or reservoir A, and preferably in zigzag form, so that chambers or galleries C' C' are formed at each side of the reservoir for filtered water, the gallery D, for unfiltered, being central to the reservoir, as shown. In this construction the walls of the filter are built up, the same as in the other figures, of uprights F F', spaced slats or bars secured thereto, and a body of sand E or other filtering material interposed between said walls. By constructing the filter in zigzag or irregular form the extent of filtering-surface is largely increased.

By constructing a filter as described not only is the superficial filtering-surface increased by the inclined ledges *a a*, but it possesses advantage in point of economy in first outlay and in convenience in maintaining the filter. It is practically self-cleaning, as all the filtering-surfaces are natural slopes, and there can be no considerable accretion of silt or sediment thereon, for before the sediment can be deposited to any considerable depth it will slough off and settle down in the gutter or trap at the bottom of the filter.

When the trap becomes filled, the reservoir is to be emptied by shutting off the discharge from the gallery for filtered water and drawing off from the gallery for unfiltered water. This will create a backflow of filtered water through the filtering material which will further cleanse the filtering-surfaces. If in time it should become necessary, the sloping surfaces can be still further cleaned by spraying from a hand-hose, the inclination being such as to rapidly shed the water sprayed upon them and cause the flow to mix with the sediment and dislodge it and cause it to fall down into the trap below. The inclined surfaces may be scraped, if desired, and should it ever become necessary to remove and wash the sand it can be done with a water-jet by washing the sand continually out from the bottom and removing it from the reservoir by means of sand-pumps and replacing it in the filter, all with the minimum amount of labor and expense.

My invention has further advantage in this, that in filling or refilling the reservoir, as the filtered water is used, there can be no material disturbance of the inclined surface of sand. Were this not avoided the natural deposit of a mucilaginous film, which collects upon sand submerged in fresh water, and which is conceded to be very effectual in collecting and removing from water micro-organisms, would be broken up and carried away, thus materially interfering with the proper purifying action of the filter.

Having thus described my invention, what I claim as new, and desire to secure by Letters Patent, is—

1. In a filter, a reservoir divided into galleries for unfiltered and filtered water by a partition formed of an outer wall facing the gallery for unfiltered water constructed of slats held one above the other, an inner apertured wall facing the gallery for filtered water and spaced from the said outer wall to form a chamber between said walls, a body of sand or other filtering material held in said chamber and disposed in outward-projecting steps or layers upon said slats, substantially as described.

2. The reservoir A, formed of walls B and bottom B' of masonry, and the gutters M formed in said bottom, combined with the walls of filtering material E supported on said bottom adjacent to said gutters, and the open inner wall $C^3$, and outer wall $C^2$, formed of uprights F supported upon the said bottom B adjacent to said gutters, and spaced slats $b\ b$ held by said uprights, substantially as and for the purposes set forth.

3. A filter comprising a reservoir formed of walls B and bottom B' of masonry, a wall or partition inclosed in said reservoir and which forms a gallery in said reservoir for filtered water, and which wall or partition is formed of a body of sand, or other filtering material, E, uprights F, F' spaced slats $b\ b$ and $c\ c$, in combination with braces J and J' arranged substantially as and for the purposes set forth.

EDGAR A. WILDER.

Witnesses:
H. P. PERRIN,
H. L. CUMMING.